US008855477B2

(12) United States Patent
Kudoh

(10) Patent No.: US 8,855,477 B2
(45) Date of Patent: Oct. 7, 2014

(54) ZOOM LENS BARREL CAPABLE OF CHANGING PHOTOGRAPHING MAGNIFICATION AND IMAGE PICKUP APPARATUS HAVING THE SAME

(75) Inventor: Tomoyuki Kudoh, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/593,687

(22) Filed: Aug. 24, 2012

(65) Prior Publication Data

US 2013/0050534 A1 Feb. 28, 2013

(30) Foreign Application Priority Data

Aug. 29, 2011 (JP) ................................. 2011-185977

(51) Int. Cl.
*G03B 7/00* (2014.01)
*G03B 17/00* (2006.01)
*G02B 7/10* (2006.01)
*G03B 9/02* (2006.01)

(52) U.S. Cl.
CPC .......... *G02B 7/10* (2013.01); *G03B 2205/0046* (2013.01); *G03B 9/02* (2013.01)
USPC ................ 396/72; 396/257; 396/505; 396/55

(58) Field of Classification Search
CPC .............. G03B 7/00; G03B 9/02; G03B 9/06; G02B 5/005; G02B 7/10
USPC ...................................... 396/72, 257, 505, 55
See application file for complete search history.

(56) References Cited

U.S. PATENT DOCUMENTS 6,835,006 B2 * 12/2004 Tanaka et al. ................. 396/349
8,014,660 B2 * 9/2011 Nomura .......................... 396/72
8,238,737 B2 * 8/2012 Ishimasa ......................... 396/72
8,243,373 B2 * 8/2012 Ishimasa ....................... 359/740
8,325,428 B2 * 12/2012 Kudoh .......................... 359/704
2004/0080655 A1 4/2004 Watanabe et al.
2006/0067671 A1 * 3/2006 Nagae ........................... 396/349
2012/0275036 A1 11/2012 Ishimasa
2013/0050534 A1 * 2/2013 Kudoh ....................... 348/240.1

FOREIGN PATENT DOCUMENTS

CN 101930110 A 12/2010
JP 10-111444 A 4/1998
JP 2004-053633 A 2/2004

OTHER PUBLICATIONS

Notification of the First Office Action for corresponding CN201210311019.9, mail date May 6, 2014. English translation provided.

* cited by examiner

*Primary Examiner* — W B Perkey
(74) *Attorney, Agent, or Firm* — Rossi, Kimms & McDowell LLP

(57) ABSTRACT

A zoom lens barrel capable of decreasing a distance between a lens and a diaphragm in an optical axis direction to thereby increase the photographing magnification and at the same time to reduce the lens barrel size, and capable of changing a diaphragm aperture diameter according to zoom control. The lens barrel has a lens relatively movable toward and away from an iris diaphragm in the optical axis direction with a change in the photographing magnification. An operation of the iris diaphragm is controlled in such a manner that a minimum diameter of an aperture of diaphragm blades of the iris diaphragm changes according to an amount of intrusion of a part of the lens into the aperture of the diaphragm blades in a range where the diaphragm blades do not interfere with the lens.

9 Claims, 6 Drawing Sheets

ZOOM LENS BARREL CAPABLE OF CHANGING PHOTOGRAPHING MAGNIFICATION AND IMAGE PICKUP APPARATUS HAVING THE SAME

BACKGROUND OF THE INVENTION

1. Field of the Invention

The present invention relates to a zoom lens barrel and an image pickup apparatus provided with the lens barrel.

2. Description of the Related Art

An image pickup apparatus such as a digital camera mounted with a zoom lens barrel has been demanded to have a high photographing magnification and a thin thickness. This poses a problem that a movement stroke of a photographing lens group must be increased, while reducing the lens barrel size.

Nevertheless, there has widely been used a camera having a lens barrel provided with an iris diaphragm for changing the amount of incident light to cope with various photographing conditions. In such a camera, a movement of a photographing lens group is restricted by the iris diaphragm provided in the lens barrel. In a case, for example, that the iris diaphragm is disposed between photographing lens groups, these lens groups cannot relatively be moved toward each other much closer than the thickness of the iris diaphragm.

Thus, there has been proposed an image pickup apparatus having a lens barrel in which a diaphragm is provided on a portion of an object-side lens surface of a lens (lens group) (see, Japanese Laid-open Patent Publication No. 2004-053633).

However, the diaphragm of the proposed image pickup apparatus has an aperture of a fixed diameter, and accordingly, if a target F number in design is determined at one of wide-angle and telephoto ends, an F number at another of the wide-angle and telephoto ends is determined by a focal distance. Thus, if an attempt is made to increase the diaphragm aperture diameter at the wide-angle end, the diaphragm aperture diameter at the telephoto end increases. To obviate this, the number of lenses must be increased, so that the lens barrel size cannot be reduced.

There has also been proposed a lens barrel frame that includes a lens having a convex spherical surface portion (Japanese Laid-open Patent Publication No. H10-111444).

However, in the lens barrel frame disclosed in Japanese Laid-open Patent Publication No. H10-111444, the diaphragm aperture diameter is merely switched between two cases where the convex spherical surface portion of the lens intrudes into the diaphragm blade aperture and where it does not intrude into the aperture. It is therefore impossible to change the diaphragm aperture diameter steplessly or in multiple steps according to zoom control.

SUMMARY OF THE INVENTION

The present invention provides a zoom lens barrel and an image pickup apparatus having the same, which are capable of reducing a distance between a lens and a diaphragm in an optical axis direction to thereby increase the photographing magnification and at the same time to reduce the lens barrel size and capable of changing a diaphragm aperture diameter according to zoom control.

According to one aspect of this invention, there is provided a zoom lens barrel capable of changing a photographing magnification, which comprises a diaphragm unit having diaphragm blades that define an aperture, a lens unit configured to be relatively movable toward and away from the diaphragm unit in a direction of an optical axis with a change in the photographing magnification, the lens unit having a lens apart of which intrudes into the aperture of the diaphragm blades when the lens unit moves close to the diaphragm unit and having a lens holding member that holds the lens, and a control unit configured to control an operation of the diaphragm unit so as to change a minimum diameter of the aperture of the diaphragm blades according to an amount of intrusion of the part of the lens into the aperture of the diaphragm blades within a range where the diaphragm blades do not interfere with the lens.

With this invention, it is possible to reduce a distance between the lens unit and the diaphragm unit in the optical axis direction to thereby increase the photographing magnification and at the same time to reduce the lens barrel size, and also possible to change the diaphragm aperture diameter steplessly or in multiple steps according to zoom control.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1A:
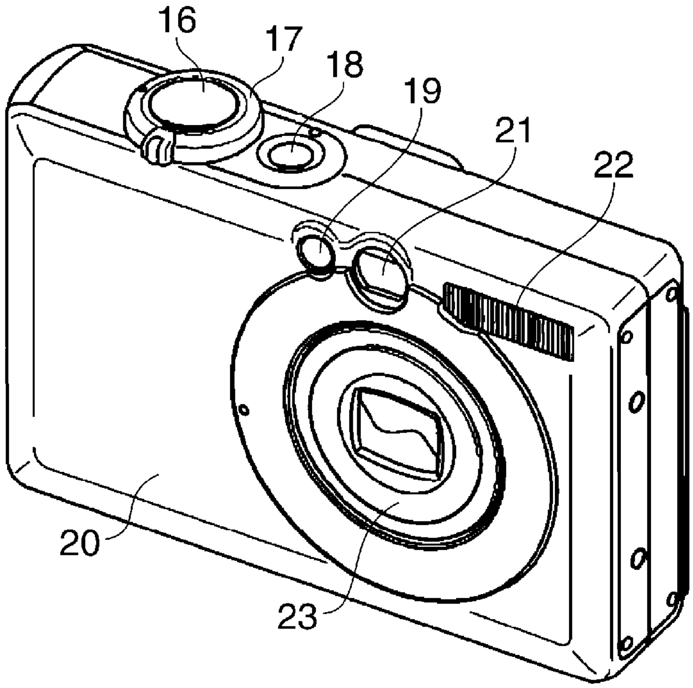
FIG. 1A is an external front perspective view of a digital camera, which is an example of an image pickup apparatus according to one embodiment of this invention.
Figure 1B:
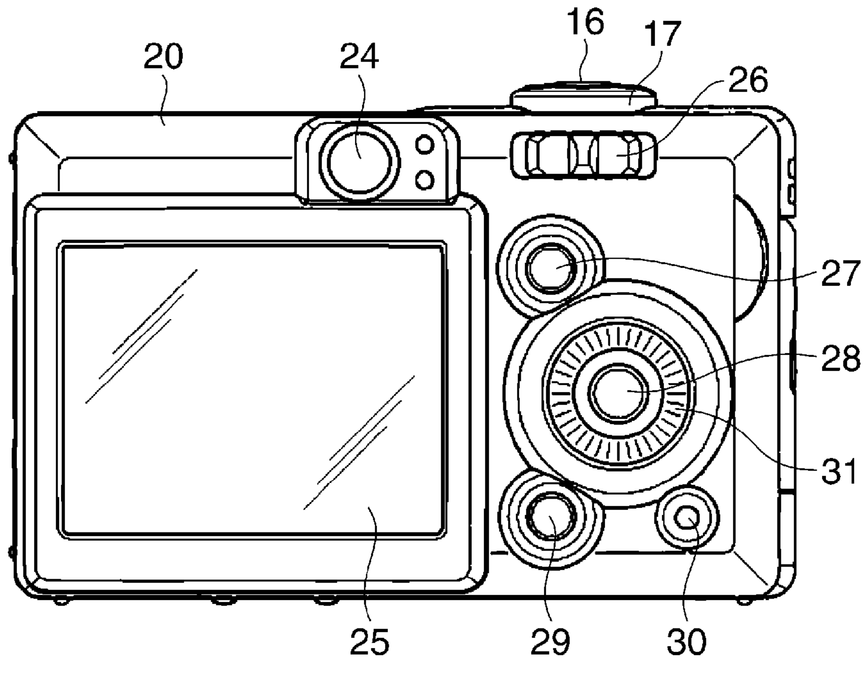
FIG. 1B is a rear view of the digital camera.

FIGS. 1A and 1B show a digital camera in external front perspective view and in rear view, respectively, where the digital camera is an example of an image pickup apparatus according to one embodiment of this invention.

As shown in FIG. 1A, the digital camera 20 of this embodiment has its front surface on which there are disposed an auxiliary light source 19 for light and distance measurements, a finder 21 used to determine the composition of an object, a strobe 22, and a lens barrel 23. The lens barrel 23 is a zoom lens barrel that has a photographing optical system movable between photographing positions (telephoto and wide-angle positions and intermediate positions therebetween in this example) and a retracted position in a direction of an optical axis and capable of changing the photographing magnification.

On an upper surface of the digital camera 20, there are disposed a release button 16, a zoom switch 17, and a power switch button 18. As shown in FIG. 1B, a finder eyepiece 24, a display 25 such as an LCD, and operation buttons 26 to 31 are disposed on a rear surface of the digital camera 20.

Figure 2:
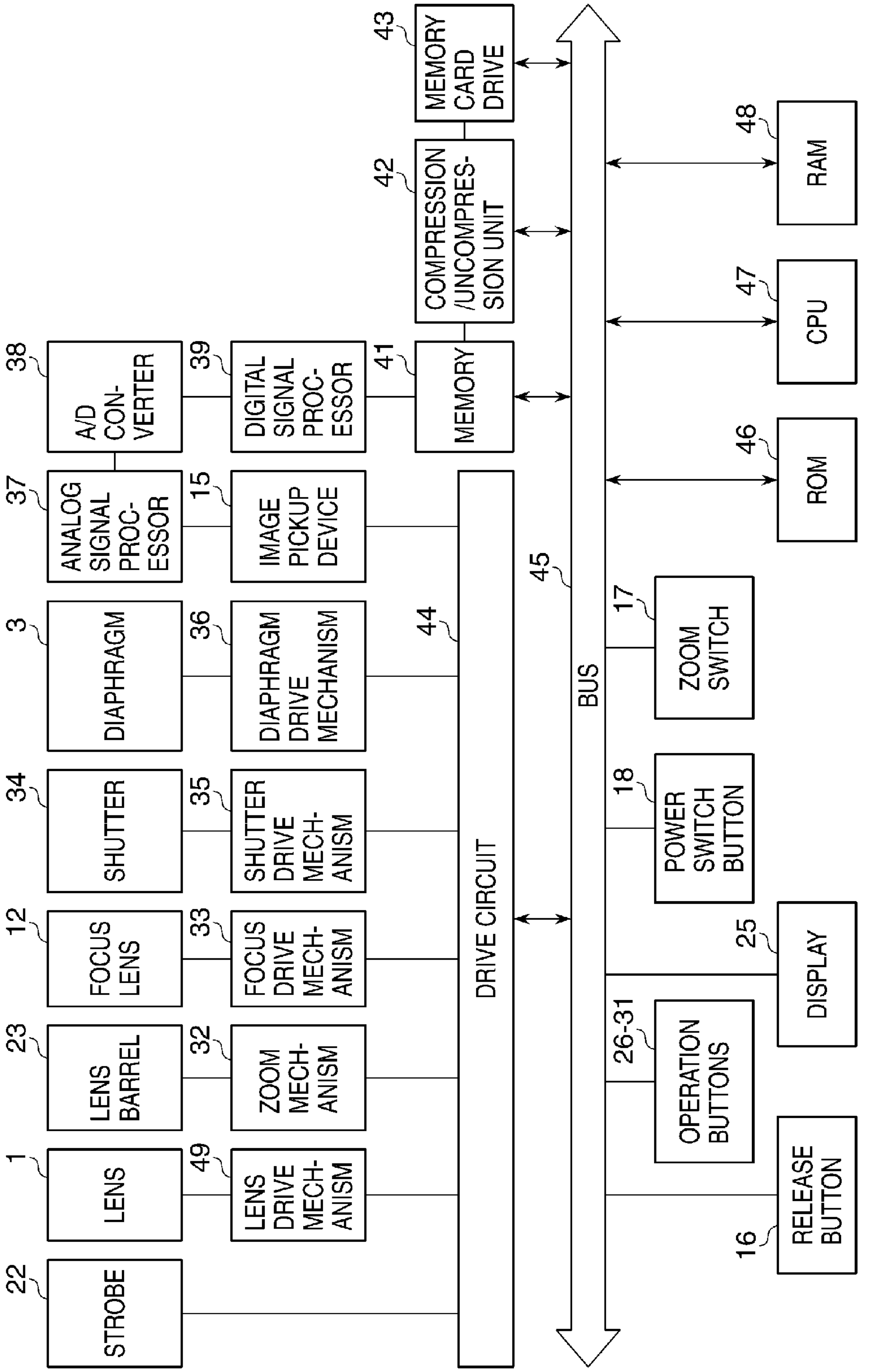
FIG. 2 is a block diagram showing a control system of the digital camera.

FIG. 2 shows in block diagram a control system of the digital camera 20.

The aforementioned release button 16, zoom switch 17, power switch button 18, display 25, and operation buttons 26 to 31 are connected to a bus 45. A memory 41, compression/uncompression unit 42, memory card drive 43, drive circuit 44, ROM 46, CPU 47, and RAM 48 are also connected to the bus 45.

The drive circuit 44 is connected with a zoom mechanism 32 that zoom-drives the lens barrel 23, a focus drive mechanism 33 that drives a focus lens 12, a shutter drive mechanism 35 that drives a shutter 34, a diaphragm drive mechanism 36 that drives an iris diaphragm 3, and a correction lens drive mechanism 49 that drives an image shake correction lens.

Figure 3:
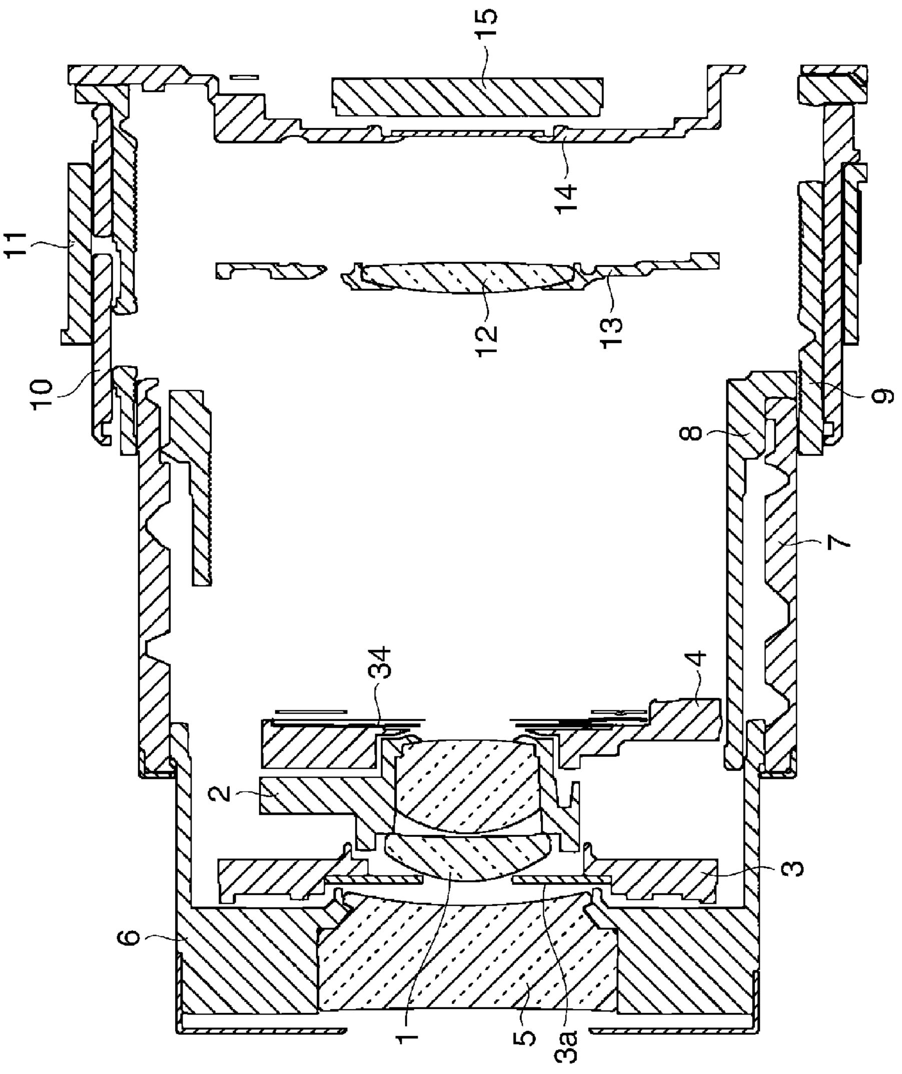
FIG. 3 is a section view of a lens barrel of the digital camera, where a photographing optical system of the lens barrel is positioned at a telephoto position.
Figure 4:
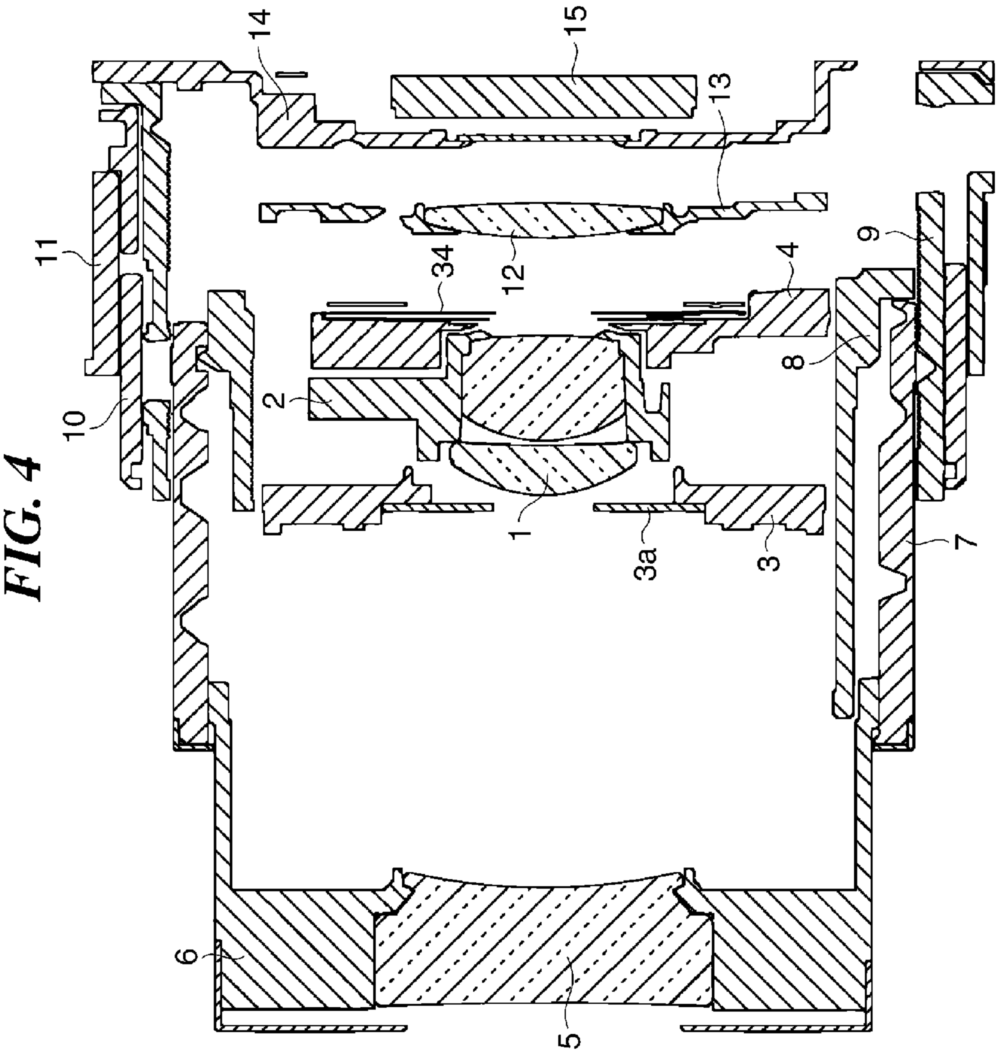
FIG. 4 is a section view of the lens barrel where the photographing optical system is positioned at a wide-angle position.
Figure 5:
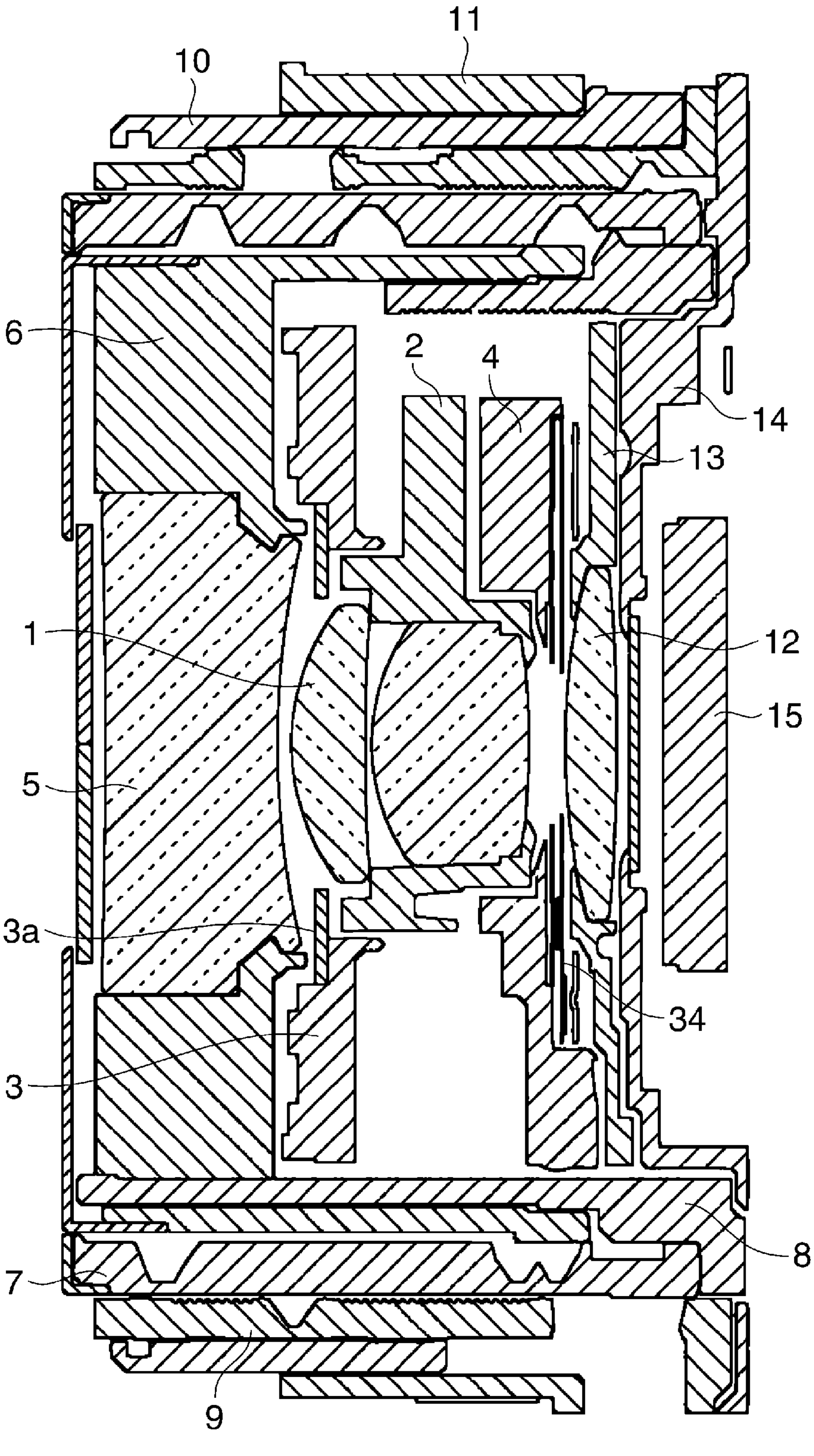
FIG. 5 is a section view of the lens barrel where the photographing optical system is positioned at a retracted position.

In this example, the correction lens drive mechanism 49 drives a second lens 1 (image shake correction lens) via a second lens holding member 2, which are shown in FIGS. 3 to 5. The iris diaphragm 3 is an example of an iris diaphragm included in a diaphragm unit of this invention.

An image pickup device 15 (such as a CCD sensor or a CMOS sensor) and the strobe 22 are also connected to the drive circuit 44. Under the control of the CPU 47, the drive circuit 44 controls the drives of respective parts of the camera that are connected to the drive circuit 44.

The ROM 46 stores a control program, etc., and the RAM 48 stores data required for execution of the control program. An analog signal processor 37 performs analog processing on image data output from the image pickup device 15 and outputs the processed image data to an A/D converter 38.

The A/D converter 38 converts the analog data received from the image pickup device 15 into digital data and outputs the digital data to a digital signal processor 39. The digital signal processor 39 performs predetermined processing on the digital data and outputs the processed data as image data to the memory 41.

The image data stored in the memory 41 is compressed by the compression/uncompression unit 42 into e.g. JPEG or TIFF data, which is then output to and stored into a memory card that is mounted to the memory card drive 43.

The image data stored in the memory 41 and the image data stored in the memory card can be uncompressed by the compression/uncompression unit 42, and the uncompressed image data can be displayed on the display 25. When image data displayed on the display 25 is viewed and determined by a user as being unnecessary to be retained for record purpose, the image data can be deleted by the user by operating the operation button 31.

Next, with reference to FIGS. 3 to 6, a description will be given of the lens barrel 23.

FIGS. 3 to 5 show the lens barrel 23 in cross section where the photographing optical system is positioned at a TELE (telephoto) position, at a WIDE (wide-angle) position, and at a retracted position, respectively.

As shown in FIGS. 3 to 5, the lens barrel 23 includes a first lens holding member 6 that holds a first lens 5, which is disposed on a side of the lens barrel closest to an object. The iris diaphragm 3 having diaphragm blades 3*a* is disposed on an image surface side of the first lens holding member 6. In other words, the diaphragm 3 is disposed rearward of the lens holding member 6. A second lens holding member 2 that holds a second lens 1 is disposed on an image surface side of the iris diaphragm 3, and an anti-vibration base plate 4 is disposed on an image surface side of the second lens holding member 2. The shutter 34 is mounted to an image surface side of the anti-vibration base plate 4. The second lens 1 and the second lens holding member 2 are an example of a lens unit of this invention.

A first cam cylinder 7 is disposed on an outer peripheral side of the first lens holding member 6, and cam grooves are formed in an inner periphery of the first cam cylinder 7. A rectilinear guide cylinder 8 is disposed on an inner peripheral side of the first lens holding member 6 and bayonet-connected with the first cam cylinder 7.

A second cam cylinder 9 is disposed on an outer peripheral side of the first cam cylinder 7. A cam groove along which a follower of the first cam cylinder 7 moves is formed in an inner periphery of the second cam cylinder 9. An actuating cylinder 10 is disposed on an outer peripheral side of the second cam cylinder 9 and held at its outer periphery by a cover member 11.

When the actuating cylinder 10 is rotatably driven by the zoom mechanism 32, the first cam cylinder 7 rotates about the optical axis and moves in the optical axis direction with the rotation of the actuating cylinder 10, while the follower of the first cam cylinder 7 moves along the cam groove of the second cam cylinder 9.

The rectilinear guide cylinder 8 bayonet-connected with the first cam cylinder 7 moves in unison with the first cam cylinder 7 in the optical axis direction, while being prevented from rotating by engagement with a rectilinear groove formed in the inner periphery of the second cam cylinder 9.

The second lens holding member 2, the iris diaphragm 3, and the anti-vibration base plate 4 move in the optical axis direction along the cam grooves formed in the inner periphery of the first cam cylinder 7, while being prevented from rotating by engagement with the rectilinear guide cylinder 8.

A focus lens holding member 13 that holds the focus lens 12 is disposed between the anti-vibration base plate 4 and the image pickup device 15. The focus lens 12 and the focus lens holding member 13 are moved in the optical axis direction by the focus drive mechanism 33, whereby a focusing operation is performed. The image pickup device 15 is held by an image pickup device holding member 14.

To increase the photographing magnification, the second lens 1 must be positioned as close to the first lens 5 as possible when the photographing optical system of the lens barrel 23 is at the TELE position (FIG. 3), to thereby increase a moving distance of the second lens 1 in the optical axis direction between the WIDE position (FIG. 4) and the TELE position.

To this end, in the present embodiment, the second lens 1 is disposed so as to be relatively movable toward and away from the iris diaphragm 3 in the optical axis direction with a change in the photographing magnification. The moving position of the second lens 1 is changed by the zoom mechanism 32 with a change in the photographing magnification. When the photographing optical system of the lens barrel 23 is at the TELE position, a part of the second lens 1 (a convex spherical surface portion in this example, which is denoted by reference numeral la in FIGS. 6A to 6C) intrudes into an aperture of the diaphragm blades 3*a* of the iris diaphragm 3 disposed between the first lens 5 and the second lens 1, so as to position the second lens 1 as close to the first lens 5 as possible.

In a state shown in FIG. 4 where the photographing optical system of the lens barrel 23 is at the WIDE position, the second lens 1 and the iris diaphragm 3 are separated away from each other in the optical axis direction, so that the diameter of the aperture of the diaphragm blades 3*a* of the iris diaphragm 3 can be changed freely without constraints.

On the other hand, in a state shown in FIG. 3 where the photographing optical system is at the TELE position, the convex spherical surface portion 1*a* of the second lens 1 intrudes into the aperture of the diaphragm blades 3*a*, so that the diameter of the aperture of the diaphragm blades 3*a* can only be changed within a range where the diaphragm blades 3*a* do not interfere with the second lens 1.

In the state shown in FIG. 5 where the photographing optical system of the lens barrel 23 is at the retracted position, the aperture of the diaphragm blades 3*a* of the iris diaphragm 3 is increased, thereby making it possible to increase the amount of intrusion of the spherical surface portion 1*a* of the second lens 1 in the optical axis direction, so that the first lens 5 and the second lens 1 can be made close to each other. As a result, the length of the lens barrel 23 in the optical axis direction can be shortened in the state where the photographing optical system is at the retracted position, whereby the size of the lens barrel 23, i.e., the size of the digital camera can be reduced.

Figure 6A:
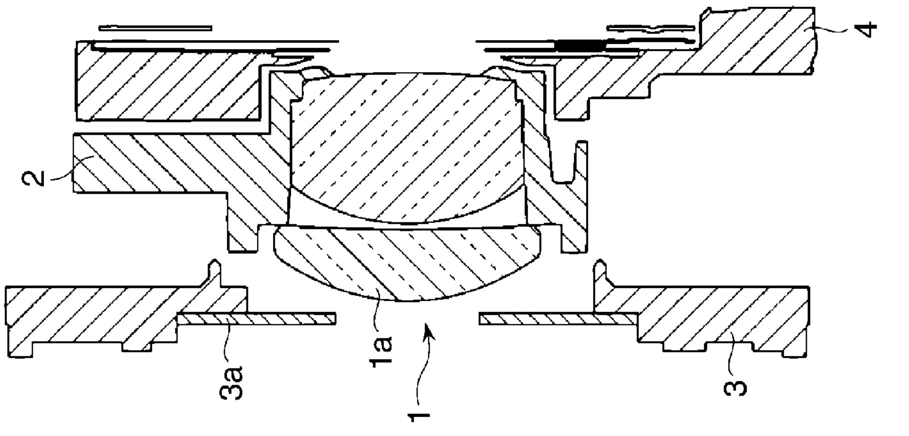
FIG. 6A is a section view showing a positional relation between a second lens and an iris diaphragm of the lens barrel, which is obtained when the photographing optical system of the lens barrel is positioned at a wide-angle position.

FIG. 6A shows in section view a positional relation between the second lens 1 and the iris diaphragm 3, which is obtained when the photographing optical system of the lens barrel 23 is positioned at the WIDE position. In the state of FIG. 6A, the second lens 1 and the diaphragm blades 3*a* are separated away from each other in the optical axis direction as previously described. Thus, the diaphragm blades 3*a* can operate without constraints, so that the aperture diameter can freely be changed.

Figure 6B:
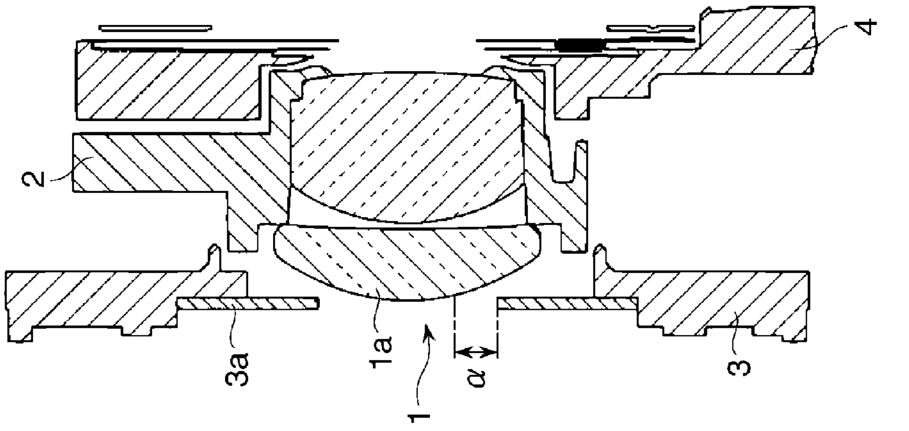
FIG. 6B is a section view showing a positional relation between the second lens and the iris diaphragm obtained when the photographing optical system is positioned at an intermediate position between the wide-angle position and a telephoto position.

FIG. 6B shows in section view a positional relation between the second lens 1 and the iris diaphragm 3 obtained when the photographing optical system of the lens barrel 23 is positioned at an intermediate position between the WIDE position and the TELE position. In the state of FIG. 6B, the second lens 1 and the diaphragm blades 3*a* are close to each other in the optical axis direction, and the convex spherical surface portion 1*a* of the second lens 1 intrudes into the aperture of the diaphragm blades 3*a*.

At that time, the CPU 47 controls, via the drive circuit 44, the diaphragm drive mechanism 36 to operate the iris diaphragm 3 in such a manner that the aperture of the diaphragm blades has a minimum diameter suitable for the photographing optical system at the intermediate position and that the periphery of the aperture of the diaphragm blades 3*a* whose aperture diameter is made minimum is positioned at a position separated away from the second lens 1 by a distance $\alpha$ in a diametral direction (i.e., in a direction perpendicular to the optical axis).

Figure 6C:
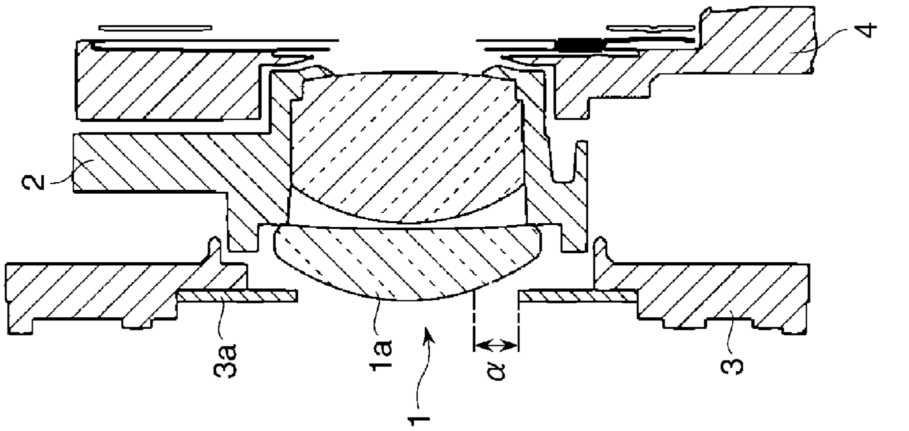
FIG. 6C is a section view showing a positional relation between the second lens and the iris diaphragm obtained when the photographing optical system is positioned at the telephoto position.

FIG. 6C shows in section view a positional relation between the second lens and the iris diaphragm obtained when the photographing optical system of the lens barrel 23 is positioned at the TELE position. In the state of FIG. 6C, the second lens 1 and the diaphragm blades 3*a* are closest to each other in the optical axis direction among cases where the photographing optical system is in either one of photographing positions (i.e., in the WIDE or TELE position or in any of intermediate positions therebetween), so that the amount of intrusion of the convex spherical surface portion 1*a* of the second lens 1 into the aperture of the diaphragm blades 3*a* becomes maximum.

At that time, as with the case where the photographing optical system is positioned at the intermediate position of FIG. 6B, the CPU 47 controls, via the drive circuit 44, the diaphragm drive mechanism 36 to operate the iris diaphragm 3 in such a manner that the aperture of the diaphragm blades has a minimum diameter suitable for the photographing optical system at the TELE position and that the periphery of the aperture of the diaphragm blades 3*a* whose aperture diameter is made minimum is positioned at a position separated away from the second lens 1 by the distance a in the diametral direction. It is preferable that the distance a has a value that ensures a minimum gap in the diametral direction between the second lens 1 and the diaphragm blades 3*a*.

It should be noted that it is not inevitably necessary to make the distance a constant in the case of changing the minimum diameter of the aperture of the diaphragm blades 3*a* according to the position of the photographing optical system. The distance $\alpha$ can be set to a proper value in a range where the diaphragm blades 3*a* do not interfere with the second lens 1. In a case that the second lens 1 is an image shake correction lens movable in the direction perpendicular to the optical axis, a proper value of the distance a is determined taking account of an amount of movement of the lens for image shake correction.

Thus, in this embodiment, a relative distance between the iris diaphragm 3 and the second lens 1 in the optical axis direction is changed with a change in photographing magnification, the amount of intrusion of the spherical surface portion 1*a* of the second lens 1 into the aperture of the diaphragm blades 3*a* is changed with the change in relative distance between the iris diaphragm 3 and the second lens 1 in the optical axis direction, and the minimum diameter of the aperture of the diaphragm blades 3*a* is changed with the change in the amount of intrusion of the spherical surface portion 1*a* of the second lens 1. More specifically, with the increasing photographing magnification, the iris diaphragm 3 and the second lens 1 are moved toward each other in the optical axis direction to increase the amount of intrusion of the spherical surface portion 1*a* of the second lens 1 into the aperture of the diaphragm blades 3*a*, and the minimum diameter of the aperture of the diaphragm blades 3*a* is increased with the increasing amount of intrusion of the spherical surface portion 1*a*.

As described above, according to this embodiment, it is possible to reduce the distance between the second lens 1 and the iris diaphragm 3 in the optical axis direction to thereby increase the photographing magnification and at the same time to reduce the lens barrel size, and also possible to change the diaphragm aperture diameter steplessly or in multiple steps according to zoom control.

It should be noted that this invention is not limited to the above-described embodiment. For example, although an example case where the iris diaphragm 3 is disposed on the object side of the second lens 1 has been described in the embodiment, this invention is also applicable to a case where the iris diaphragm 3 is disposed on the image surface side of the second lens 1. In the embodiment, a case has been described in which the iris diaphragm is used as the diaphragm unit, however, any other type of diaphragm unit can be used.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-185977, filed Aug. 29, 2011, which is hereby incorporated by reference herein in its entirety.

What is claimed is:

1. A zoom lens barrel comprising:
a diaphragm unit having diaphragm blades that define an aperture;
a lens unit configured to be relatively movable toward and away from said diaphragm unit in a direction of an optical axis with a change in a photographing magnification, wherein said lens unit has a lens a part of which intrudes into the aperture of the diaphragm blades when said lens unit moves close to said diaphragm unit, and has a lens holding member which holds the lens; and
a control unit configured to control an operation of said diaphragm unit, wherein the control unit controls a minimum diameter of the aperture of the diaphragm blades according to an amount of intrusion of the part of the lens into the aperture of the diaphragm blades within a range where the diaphragm blades do not interfere with the lens.

2. The lens barrel according to claim 1, wherein in a case where the minimum diameter of the aperture of the diaphragm blades is changed, said control unit controls the operation of said diaphragm unit in order to maintain a distance between the lens and the diaphragm blades in a direction perpendicular to the optical axis constant.

3. The lens barrel according to claim 1, wherein said control unit controls the operation of said diaphragm unit in such a manner that the minimum diameter of the aperture of the diaphragm blades increases with increase of the amount of intrusion of the part of the lens into the aperture of the diaphragm blades.

4. The lens barrel according to claim 1, wherein said diaphragm unit includes an iris diaphragm.

5. An image pickup apparatus comprising:
an image pickup device; and
a zoom lens barrel comprising:
a diaphragm unit having diaphragm blades that define an aperture;
a lens unit configured to be relatively movable toward and away from said diaphragm unit in a direction of an optical axis with a change in a photographing magnification,
wherein said lens unit has a lens a part of which intrudes into the aperture of the diaphragm blades when said lens unit moves close to said diaphragm unit, and has a lens holding member which holds the lens; and
a control unit configured to control an operation of said diaphragm unit,
wherein the control unit controls a minimum diameter of the aperture of the diaphragm blades according to an amount of intrusion of the part of the lens into the aperture of the diaphragm blades within a range where the diaphragm blades do not interfere with the lens.

6. A lens barrel comprising:
a diaphragm unit having diaphragm blades that define an aperture;
a lens unit configured to be movable in a direction of an optical axis,
wherein the lens unit moves so that a part of the lens unit intrudes into the aperture of the diaphragm blades; and
a control unit configured to control the diaphragm unit,
wherein in a case where the part of the lens unit intrudes into the aperture of the diaphragm blades, the control unit controls a minimum diameter of the aperture according to an amount of intrusion of the part of the lens unit so that the diaphragm blades do not interfere with the part of the lens unit.

7. The lens barrel according to claim 6, wherein the control unit changes a minimum diameter of the aperture so that a predetermined distance between the part of the lens unit and the diaphragm blades in a direction perpendicular to the optical axis is provided.

8. The lens barrel according to claim 6, wherein the diaphragm unit includes an iris diaphragm.

9. The image pickup apparatus comprising:
an image pickup apparatus; and
a lens barrel comprising:
a diaphragm unit having diaphragm blades that define an aperture;
a lens unit configured to be movable in a direction of an optical axis,
wherein the lens unit moves so that a part of the lens unit intrudes into the aperture of the diaphragm blades; and
a control unit configured to control the diaphragm unit,
wherein in a case where the part of the lens unit intrudes into the aperture of the diaphragm blades, the control unit controls a minimum diameter of the aperture according to an amount of intrusion of the part of the lens unit so that the diaphragm blades do not interfere with the part of the lens unit.

* * * * *